US012018831B2

(12) United States Patent
Okada et al.

(10) Patent No.: US 12,018,831 B2
(45) Date of Patent: Jun. 25, 2024

(54) LIGHTING DEVICE

(71) Applicant: Japan Display Inc., Tokyo (JP)

(72) Inventors: Masafumi Okada, Tokyo (JP); Nobuyuki Suzuki, Tokyo (JP); Makoto Hasegawa, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/116,878

(22) Filed: Mar. 3, 2023

(65) Prior Publication Data

US 2023/0280013 A1 Sep. 7, 2023

(30) Foreign Application Priority Data

Mar. 4, 2022 (JP) ................................. 2022-033350

(51) Int. Cl.
| F21V 5/00 | (2018.01) |
| F21V 7/06 | (2006.01) |
| F21V 9/08 | (2018.01) |
| G02F 1/29 | (2006.01) |

(52) U.S. Cl.
CPC ................ F21V 5/008 (2013.01); F21V 7/06 (2013.01); F21V 9/08 (2013.01); G02F 1/29 (2013.01)

(58) Field of Classification Search
CPC ..... G02F 1/29; F21V 9/08; F21V 7/06; F21V 5/008
See application file for complete search history.

(56) References Cited

U.S. PATENT DOCUMENTS

| 2007/0139333 | A1* | 6/2007 | Sato | G02F 1/29 |
| | | | | 345/90 |
| 2014/0028924 | A1* | 1/2014 | Yamaguchi | A61B 1/00193 |
| | | | | 349/1 |
| 2019/0089880 | A1* | 3/2019 | Murao | H04N 23/57 |
| 2021/0325024 | A1* | 10/2021 | Hasegawa | G02F 1/133738 |
| 2021/0364882 | A1* | 11/2021 | Yan | G02F 1/134309 |

FOREIGN PATENT DOCUMENTS

| JP | 2008-47541 A | 2/2008 |
| WO | 2012/099127 A1 | 7/2012 |

* cited by examiner

Primary Examiner — Evan P Dzierzynski
Assistant Examiner — Nathaniel J Lee
(74) Attorney, Agent, or Firm — XSENSUS LLP

(57) ABSTRACT

The purpose is to realize a lighting device of thin, small light distribution angle, and less leak light. Further, the purpose is to realize a lighting device which can control light beam accurately with liquid crystal lenses. The structure of the invention is as follows. A lighting device including: a reflector cylinder including a mirror thereinside; and a liquid crystal lens assembly that is disposed at a light emitting surface of the reflector cylinder and includes a plurality of liquid crystal lenses being stacked, in which the liquid crystal lens assembly includes a light shading film which defines a light emitting area of the liquid crystal lens assembly and which is formed in parallel with the light emitting surface of the reflector cylinder.

8 Claims, 21 Drawing Sheets

A-A

LIGHTING DEVICE

CLAIM OF PRIORITY

The present application claims priority from Japanese Patent Application JP 2022-033350 filed on Mar. 4, 2022, the content of which is hereby incorporated by reference into this application.

BACKGROUND OF THE INVENTION

(1) Field of the Invention

The present invention relates to a thin lighting device having small lighting distribution angle and small light leakage to surroundings.

(2) Description of the Related Art

Among the lighting devices, when it is used as a spot light, for example, a lighting device of high directivity, that is to say, a lighting device of a small light distribution is required. Conventionally, a parabolic mirror has been used for that purpose, namely, for a parallel light. That lighting device, however, needs a depth for a parallel light, thus, it is difficult to make the lighting device small or thin.

When such lighting device is made thin, it becomes difficult to make the light distribution angle small. In addition, there arises a problem that light leakage having a very high outgoing angle is generated.

Outgoing light can be controlled by a liquid crystal lens; however, even in this case, control to light of high outgoing angle is difficult. Patent document 1 discloses a structure that a plurality of liquid crystal panels are used in stacked manner. Patent document 2 discloses to use a liquid crystal lens in several optical devices.

PRIOR TECHNICAL DOCUMENT

Patent Document

Patent document 1: Japanese patent application laid open No. 2008-47541
WO 2012/099127 A1

SUMMARY OF THE INVENTION

When parallel light is formed with a parabolic mirror, a depth of the parabolic mirror must be large; else, an element of high angle of emitting light with respect to a light axis (herein after may be called as a diverging light) increases; consequently, a sharp spot is difficult to be acquired. When a divergent light is intended to be smaller, a depth of the parabolic mirror becomes large; consequently, a depth of the lighting device becomes larger.

When a liquid crystal lens is used to control light as for convergence, a divergence, a deflection and so forth, it is difficult to control the light of large emitting angle with respect to a light axis.

A purpose of the present invention is to realize a thin lighting device having low divergent angle, namely, to acquire a sharp light spot. Another purpose of the present invention is to control the light efficiently with a liquid crystal lens when the liquid crystal lens is disposed at light emitting surface of the lighting device.

The present invention solves the above explained problems; examples of concrete structures of the present invention are as follows.

(1) A lighting device including: a reflector cylinder including a mirror thereinside, and a liquid crystal lens assembly that is disposed at a light emitting surface of the reflector cylinder and includes a plurality of liquid crystal lenses being stacked, in which the liquid crystal lens assembly includes a light shading film which defines a light emitting area of the liquid crystal lens assembly and which is formed in parallel with the light emitting surface of the reflector cylinder.

(2) The lighting device according to (1), in which an outer shape of the liquid crystal lens is rectangle, and the light emitting area is circle in a plan view.

(3) The lighting device according to (1), in which the plurality of liquid crystal lenses are two liquid crystal lenses.

(4) The lighting device according to (1), in which the plurality of liquid crystal lenses are four liquid crystal lenses.

(5) The lighting device according to (1), in which the liquid crystal lens has a structure in which liquid crystal is sandwiched between a first substrate and a second substrate, and the light shading film is formed on an opposite side to the liquid crystal of either the first substrate or the second substrate.

(6) The lighting device according to (1), in which the liquid crystal lens has a structure in which liquid crystal is sandwiched between a first substrate and a second substrate, and the light shading film is formed on a side of the liquid crystal of either the first substrate or the second substrate.

(7) The lighting device according to (1), in which the liquid crystal lens has a structure in which liquid crystal is sandwiched between a first substrate and a second substrate, the first substrate and the second substrate adhere with black seal material, and the black seal material acts as the light shading film.

(8) The lighting device according to (1), in which the light shading film is formed from black adhesive to adhere the plurality of liquid crystal lenses with each other.

DETAILED DESCRIPTION OF THE PREFERRED EMBODIMENTS

Figure 1:
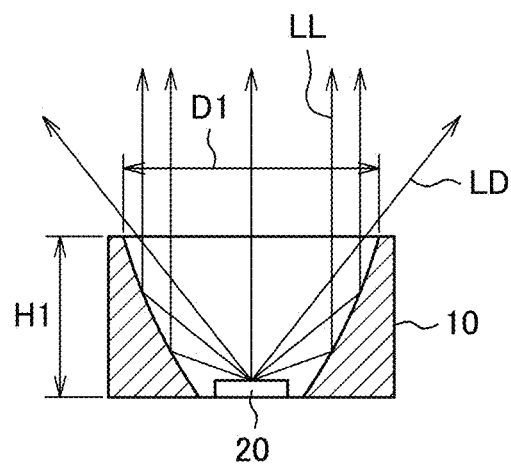
FIG. 1 is a cross sectional view to show an action of a reflector cylinder including a parabolic mirror.
Figure 2:
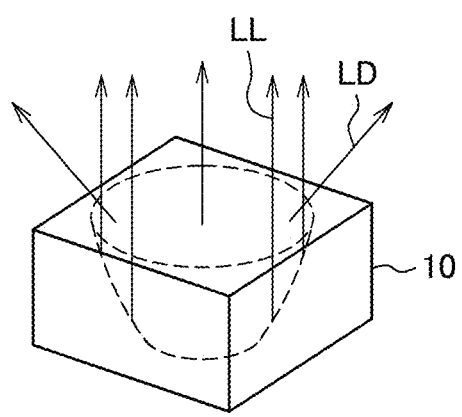
FIG. 2 is a perspective view of FIG. 1.

FIG. 1 is a cross sectional view of a lighting device having a reflector cylinder 10 which has a parabolic mirror thereinside; FIG. 2 is a perspective view of FIG. 1. The lighting device of FIGS. 1 and 2 are used for a light projector for a spot light. In FIG. 1, at center of a bottom of the reflector cylinder 10, an LED 20 is disposed as a light source. A diameter D1 of light emitting surface of the reflector cylinder 10 of FIG. 1 is e.g. 6.5 mm, and a height H1 of the reflector cylinder is e.g. 4 mm.

Light from the LED 20 is divergent light having a large light distribution angle, the divergent light is reflected with the parabolic mirror to form a collimated light LL which is parallel to the light axis. Some range of light is, however, emitted to outside not being reflected by the parabolic mirror. This light LD (called herein after as divergent light) has a large angle with respect to the light axis, thus, causes a blur.

FIG. 2 is a perspective view of FIG. 1. As shown in FIG. 2, the light emitting surface of the parabolic mirror of the reflector cylinder 10 is circle. The LED 20 is omitted in FIG. 2. In FIG. 2, the light reflected with the parabolic mirror becomes the light LL parallel to the light axis; the light LD directly emitted from the reflector cylinder without being reflected with the parabolic mirror becomes a cause of blur.

Figure 3:
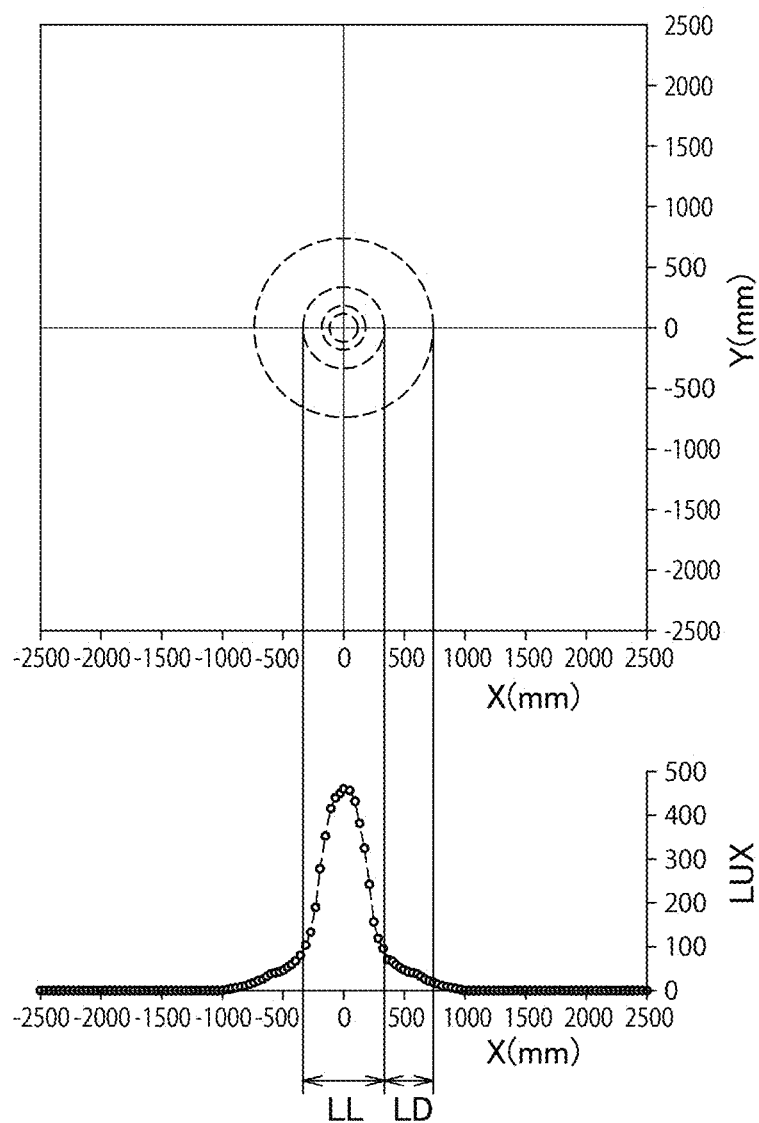
FIG. 3 is a luminance distribution of a light spot formed by a lighting device of FIG. 1.
Figure 13:
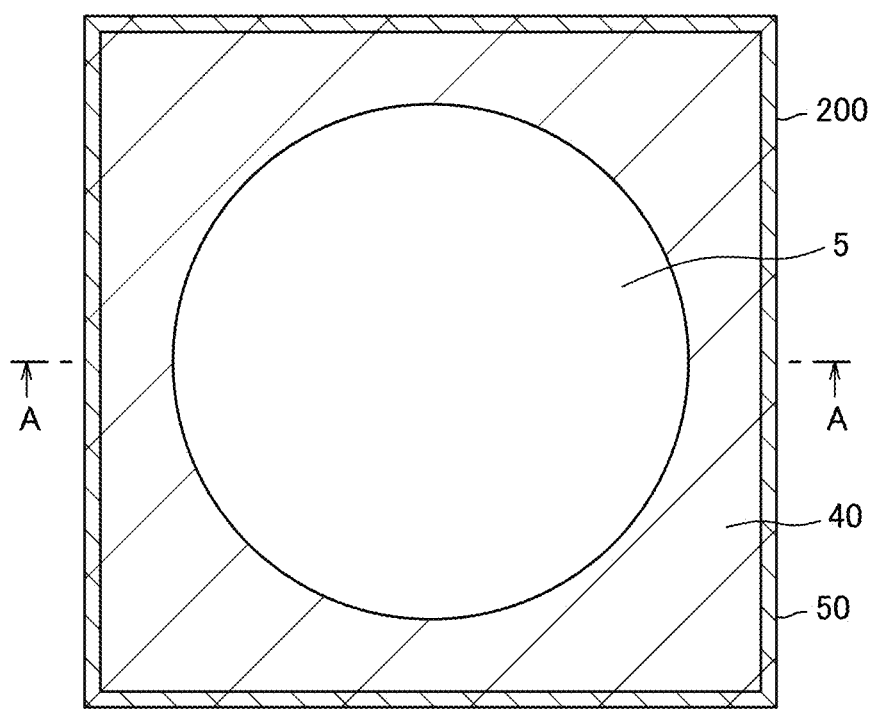
FIG. 13 is a plan view of a liquid crystal lens according to embodiment 1.

FIG. 3 is a luminance distribution when a light spot is projected on a screen, 1000 mm apart from the light source. The top figure in FIG. 13 is a plan view which shows a shape of a light spot; circles of broken lines are contours of luminance. In FIG. 13, X (mm) is a diameter of the spot in the lateral direction; Y (mm) is a diameter of the spot in the longitudinal direction.

The bottom figure of FIG. 13 is a graph which shows a luminance distribution. X axis (mm) is a position in the lateral direction, in which a center is zero; Y axis (LUX) is a luminance corresponding to each of the positions. As clearly shown in the bottom figure in FIG. 3, the luminance distribution has a large foot, that is to say, a blur is large.

Figure 4:
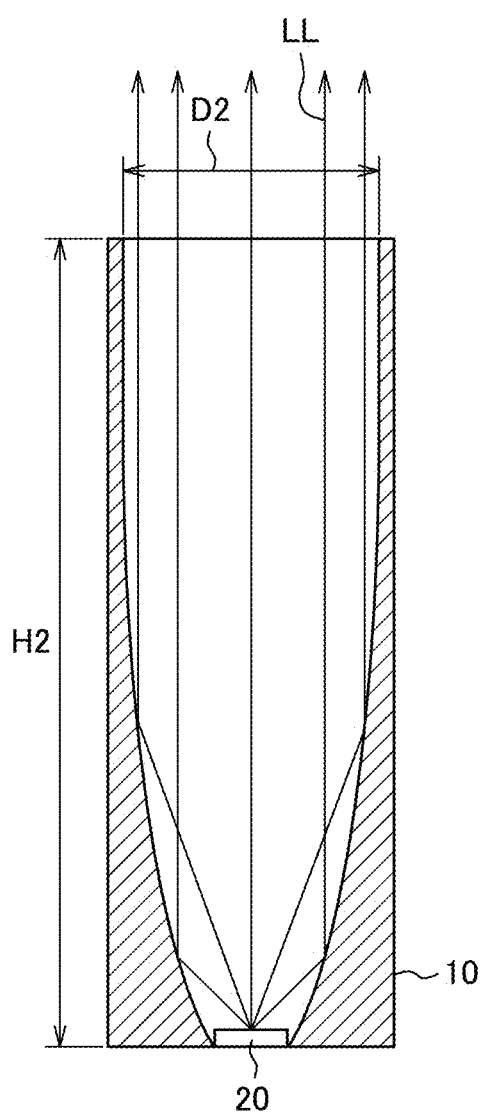
FIG. 4 is a cross sectional view to show an action of a tall reflector cylinder.

FIG. 4 is a cross sectional view of a reflector cylinder to counter measure this problem. The reflector cylinder 10 in FIG. 4 has an LED 20 as a light source at a center of the bottom of the reflector cylinder 10. In FIG. 4, a height H2 of the reflector cylinder 10 is 39.3 mm; a diameter D of the emitting surface of the parabolic mirror of the reflector cylinder 10 is 13 mm. An aspect ratio H1/D1 of FIG. 1 is 0.615; an aspect ratio H2/D2 of FIG. 4 is 3.038. A ratio of a height of the reflector cylinder 10 with respect to a diameter of the emitting surface of the parabolic mirror is much larger in FIG. 4 than in FIG. 1.

Figure 5:
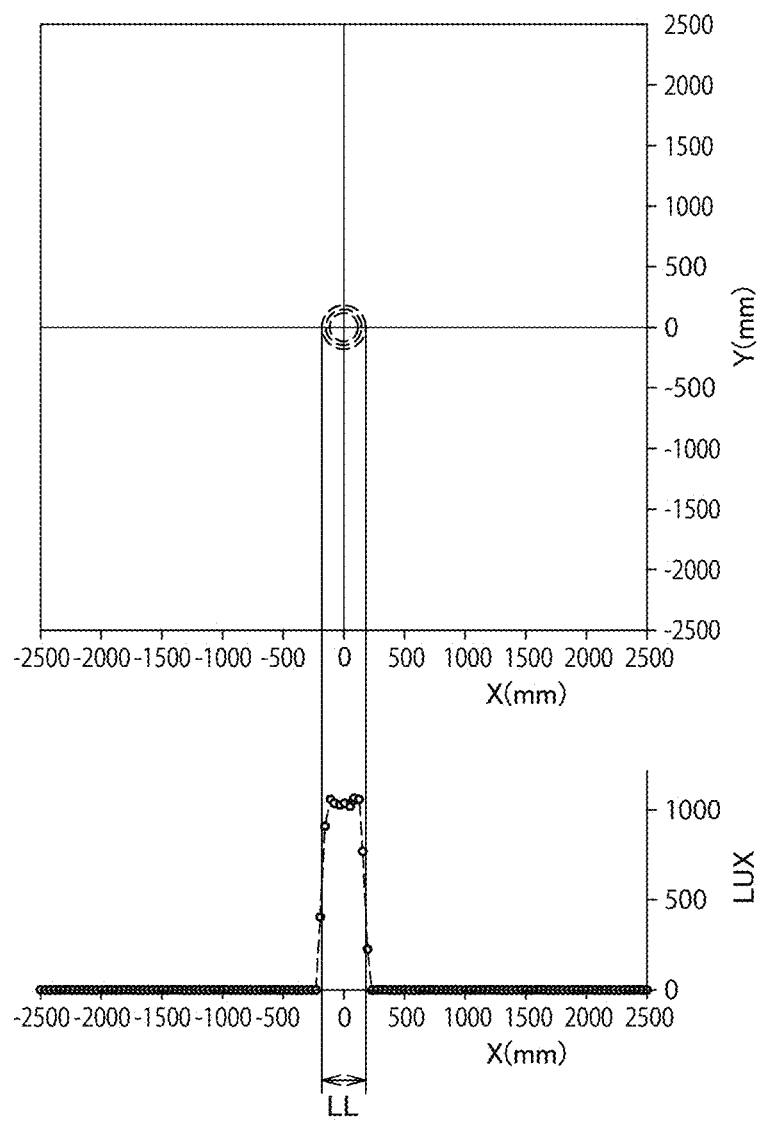
FIG. 5 is a luminance distribution of a light spot formed by a lighting device of FIG. 4.

As a result, as depicted by arrows in FIG. 4, most of light emitting from the reflector cylinder 10 is parallel to the light axis. FIG. 5 is an example of a light spot when the reflector cylinder 10 of FIG. 4 is used. The measuring condition is the same as that of FIG. 3. That is to say, the light spot is measured at the screen, 1000 mm apart from the lighting device. Explanations of the top figure and the bottom figure of FIG. 5 are the same as that of FIG. 3. Comparing FIG. 5 with FIG. 3, the light spot is sharper in FIG. 5. In other words, a diameter of the light spot is much smaller in the top figure in FIG. 5, and a foot of luminance distribution is almost not visible in the bottom figure in FIG. 5.

The structure of FIG. 4, however, has a problem that a height H2 of the reflector cylinder 10 become large. Therefore, it is not used when a lighting device of small depth is necessary.

Figure 6:
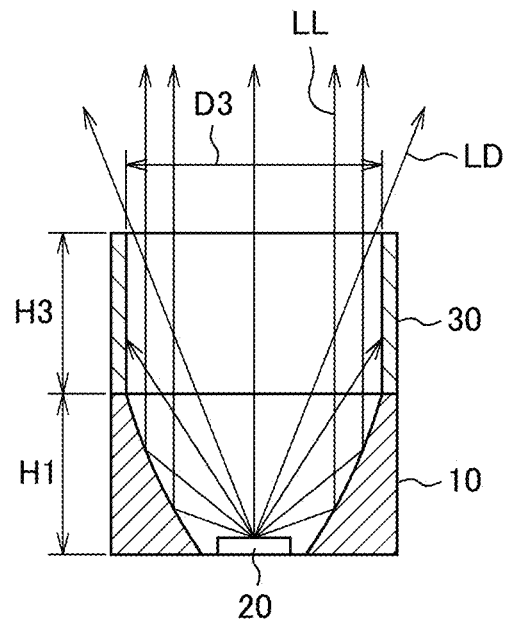
FIG. 6 is a cross sectional view to show an action of a lighting device which uses a light shading cylinder, which has a light absorbing wall, with the reflector cylinder.
Figure 7:
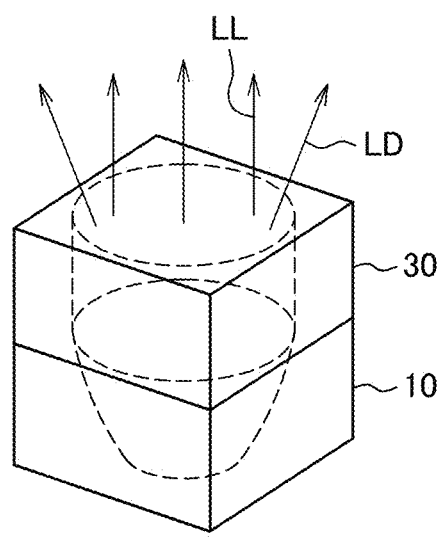
FIG. 7 is a perspective view of FIG. 6.

FIG. 6 is a structure to counter measure this problem in which a light shading cylinder 30 is used at the light emitting side of the reflector cylinder 10 to decrease divergent light LD and to increase parallel light LL. FIG. 7 is a perspective view of FIG. 6. The light shading cylinder 30 has a cylinder like light transmitting region in a quadrangular prism. A light emitting surface of the light emitting region of the quadrangular prism 30 is circle; an inside of the quadrangular prism is formed from black light absorbing body.

In FIG. 6, in addition to the light emitted from the LED 20 along with the light axis, the light reflected from the parabolic mirror is emitted along the light axis and becomes a parallel light LL. The divergent light LD, which causes a blur of light spot, impinges to an inner wall of the light shading cylinder 30. Since an inner wall of the light shading cylinder 30 is formed from light absorbing material, the light, impinged at the inner wall of the light shading cylinder 30, does not come outside. A diameter D3 of the emitting surface of the light shading cylinder 30 is 6.5 mm, which is the same as the diameter D1 of the parabolic mirror 10.

Figure 8:
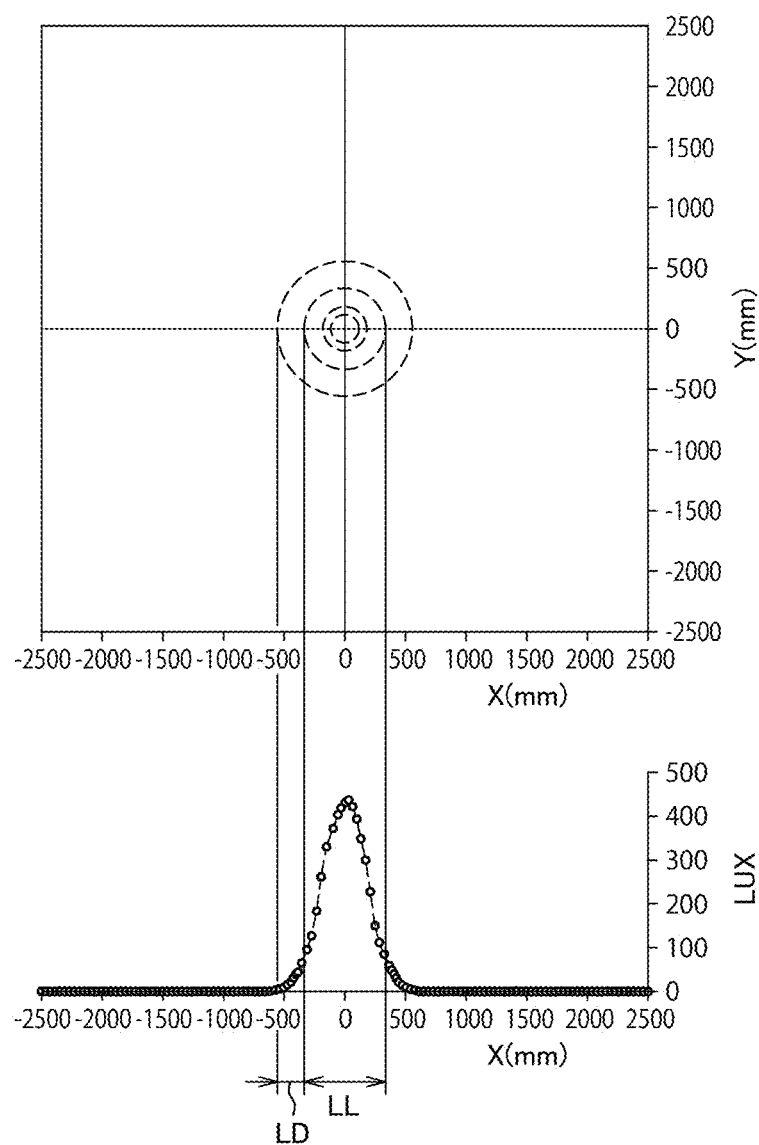
FIG. 8 is a luminance distribution of a light spot formed by the lighting device of FIG. 6.

Therefore, in FIG. 6, an angle of the divergent light LD with respect to the light axis becomes smaller and an amount of the divergent light LD becomes also smaller. FIG. 8 is an example of the light spot when the light shading cylinder 30 of FIG. 6 is used. The measuring conditions are the same as that of FIG. 3. That is to say, the light spot is measured at the screen, 1000 mm apart from the lighting device. Explanations of the top figure and the bottom figure of FIG. 8 are the same as that of FIG. 3. Comparing FIG. 8 with FIG. 3, the light spot is sharper in FIG. 8. In other words, a diameter of the light spot is much smaller in the top figure in FIG. 8, and a foot of luminance distribution is smaller in the bottom FIG. in FIG. 8 than that of FIG. 3.

In FIG. 6, a height of total lighting device is a summation of a height H1 of the reflector cylinder 10 and a height H3 of light shading cylinder 30. The structure of FIG. 6, however, needs to make the height H3 of the light shading cylinder 30 higher for more effectiveness. However, it is not desirable to make H1+H3 large for a thin lighting device. As a result, it becomes a tradeoff between a height of the lighting device and an improvement of light spot. None the less, it is more effective to improve a luminance distribution in light spot by combination of the reflector cylinder 10 and the light shading cylinder 30 than by a reflector cylinder 10 only.

By the way, there is a case to converge, diverge, or deflect the emitting light. In that case, if a liquid crystal lens is used, a lens effect can be easily controlled by changing voltages to the electrodes of the liquid crystal lens.

Figure 9:
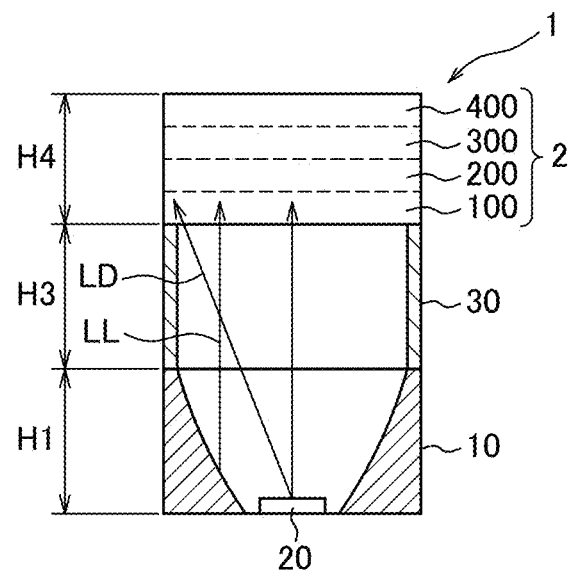
FIG. 9 is a cross sectional view to show an action of a lighting device which uses a plurality of liquid crystal lenses disposed on the structure of FIG. 6.

FIG. 9 is a cross sectional view of the lighting device 1 in which a liquid crystal lens assembly 2 formed from liquid crystal lenses 100, 200, 300, and 400 on the light shading cylinder 30. The structure and the effect of the liquid crystal lens is explained later. Each of the liquid crystal lenses 100, 200, 300 and 400 is formed as that a TFT substrate, on which first electrodes are formed, and a counter substrate, on which second electrodes are formed, are adhered to each other by seal material 50. The liquid crystal lenses 100, 200, 300, and 400 are adhered to each other by a transparent adhesive and so forth.

Figure 10:
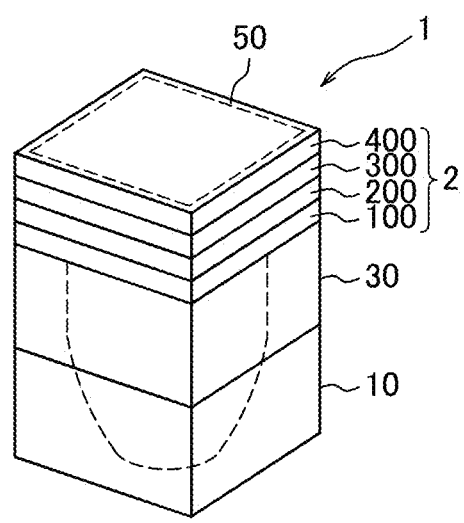
FIG. 10 is a perspective view of FIG. 9.

In FIG. 10, item 50 shows a seal material 50 in each of the liquid crystal lenses; the seal material 50 is not formed on a surface of the liquid crystal lens. A width of the seal material 50 is generally formed as narrow as possible to make an effective area of the liquid crystal lens 100 larger. The seal material 50 may be transparent or may be black.

In FIG. 9, since a thickness of each of the liquid crystal lenses 100, 200, 300, and 400 is approximately 1 mm, a total thickness of four liquid crystal lenses (namely, a liquid crystal lens assembly 2) is approximately 4 mm. In FIG. 9, a height H1 of the reflector cylinder 10 is 4 mm; a height H3 of the light shading cylinder is 4 mm and a total height H4 of the four liquid crystal lenses is 4 mm; therefore, total thickness of the lighting device is 12 mm.

In FIG. 9, in addition to the light emitted from the LED 20 along with the light axis, the light reflected from the parabolic mirror in the reflector cylinder 10 constitutes a parallel light LL. The light emitted from the LED 20 in a certain range with respect to the light axis is absorbed by the light shading cylinder 30. The light LD which is not reflected and not absorbed by the light shading cylinder 30 (divergent light) also enters the liquid crystal lens.

That is to say, two kinds of light are incident in the liquid crystal lens. The liquid crystal lens, however, cannot affect simultaneously to the two kinds of light. In this case, the liquid crystal lens is designed to affect the parallel light LL. Consequently, the liquid crystal lens cannot properly control the divergent light LD.

Either a height H1 of the reflector cylinder 10 or a height H3 of the light shading cylinder 30 must be made higher to increase parallel light LL, which can be accurately controlled, and to decrease divergent light LD. In that case, it is difficult to realize a thin lighting device.

The embodiments below of the present invention overcome the above problems and can realize a thin lighting device which can provide a desirable light spot. In addition, when a liquid crystal lens is used, an accurate control by the liquid crystal lens can be enabled.

Embodiment 1

Figure 11:
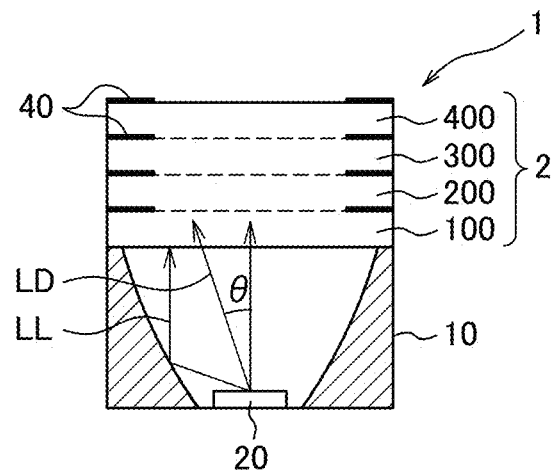
FIG. 11 is a cross sectional view of embodiment 1.
Figure 12:
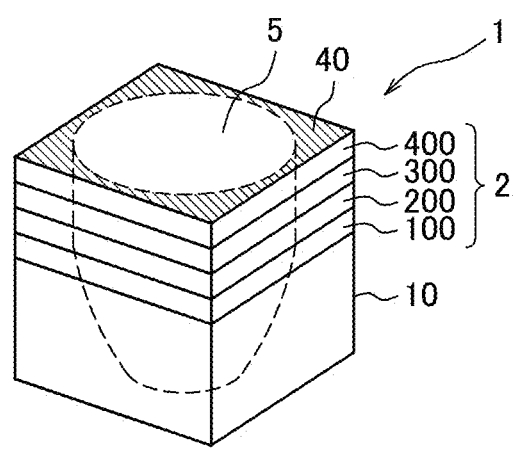
FIG. 12 is a perspective view of FIG. 11.

FIG. 11 is a cross sectional view of embodiment 1; FIG. 12 is a perspective view of FIG. 11. In FIG. 11, the liquid crystal lens assembly 2 formed from liquid crystal lenses 100, 200, 300, and 400 is disposed on the light shading cylinder 10. In FIG. 11, the action of the reflector cylinder 10 is the same as explained in FIG. 1. By the way, the reflecting mirror is not only a parabolic mirror but can be any mirrors which can form a parallel light. The liquid crystal lens in FIG. 11 differs from the liquid crystal lens in FIG. 9 is that each of the liquid crystal lenses in FIG. 11 has a light shading film 40.

In FIG. 11, divergent light LD having angle θ or more with respect to the light axis is not emitted from the liquid crystal lens 400 due to the existence of the light shading film 40. That is to say, the light which cannot be controlled by the liquid crystal lenses 100, 200, 300, and 400 is not emitted due to the existence of the light shading film 40. Therefore, an amount of light controlled by liquid crystal lenses 100, 200, 300, and 400 is increased in the light emitted from the liquid crystal lens, thus, a light spot close to design value can be obtained.

FIG. 12 is a perspective view of FIG. 11. In FIG. 12, although the outer shape of the liquid crystal lenses 100, 200, 300, and 400 is rectangle, the shape of a light emitting area 5 is circle. The light emitting area 5 is defined by light shading film 40. As depicted in FIG. 12, a width of the light shading film 40 is large specifically in diagonal directions of liquid crystal lenses 100, 200, 300, and 400. Therefore, the effect of the present invention is specifically big in diagonal directions of the liquid crystal lenses.

Figure 14:
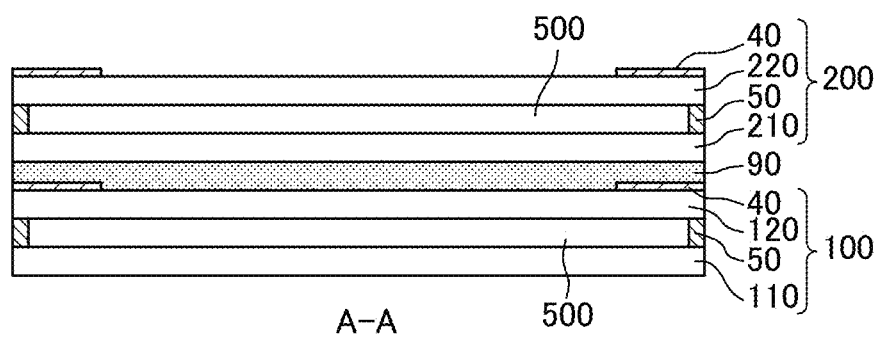
FIG. 14 is a cross sectional view of a liquid crystal lens according to embodiment 1.

FIG. 13 is a plan view of the liquid crystal lens in FIG. 11; FIG. 14 is a cross sectional view of FIG. 13 along the line A-A. FIGS. 13 and 14 show only the first liquid crystal lens 100 and the second liquid crystal lens 200. Outer shapes of the third liquid crystal lens 300 and the fourth liquid crystal lens 400 are the same as the first liquid crystal lens 100 and the second liquid crystal lens 200.

FIG. 13 is a plan view of the second liquid crystal lens 200. In FIG. 13, the light emitting area 5 is circle, which is defined by light shading film 40. Among the light from the reflector cylinder 10, the light shading film 40 shields the divergent light LD and emits the light LL which is accurately controlled by the liquid crystal lens, or the light having a small angle with respect to the light LL. In FIG. 13, the frame 50 is a seal material 50 to adhere the TFT substrate 100 and the counter substrate 200 to each other. A width of the seal material 50 is much smaller than a width of the light shading film 40.

As to the light shading film 40 in FIG. 13, light shading material can be coated on the outer surface of the counter substrate 200. For example, epoxy resin containing graphite can be screen printed for the light shading film 40. There are many kinds of epoxy resin; among them there exists epoxy resin that cures at low temperature. There are UV curing epoxy resin. In addition, since graphite is conductive, the light shading film 40 can be applied with a basic potential. The light shading film 40 can be formed from other black insulating resin. Herein after the light shading film 40 in FIGS. 13 and 14 may be called as an outer light shading film 40. In the meantime, the printing can be made not only by screen printing but also formed by ink jet printing.

FIG. 14 is a cross sectional view of FIG. 13. In FIG. 14, the first liquid crystal lens 100 and the second liquid crystal lens 200 are adhered to each other by transparent adhesive 90. In FIG. 14, the first liquid crystal lens 100 is explained as an example; the liquid crystal 500 is sandwiched between the TFT substrate 110 and the counter substrate 120. Electrodes and alignment films and so forth are formed on side of the TFT substrate 110 and the counter substrate 120, which will be explained later. The feature of FIG. 14 is that the light shading films 40 are formed on outsides of the counter substrates 120 and 220 to prevent the divergent light, which has a large angle with respect to the light axis, from being emitted. The structures of the third liquid crystal lens 300 and the fourth liquid crystal lens 400 are in the same structure. As a result, a light spot of small light distribution angle can be obtained. In the meantime, a width of the light shading film 40 is large in diagonal direction as shown in FIG. 13. In other words, the present invention is specifically effective in diagonal direction.

The outer shading films 40 are formed outsides of the counter substrates 120 and 220; however, they can be formed on the TFT substrates 110 and 210 or they can be formed both of the counter substrates 120 and 220 and the TFT substrates 110 and 210. The coating method in this case also the same as above explained process.

Figure 15:
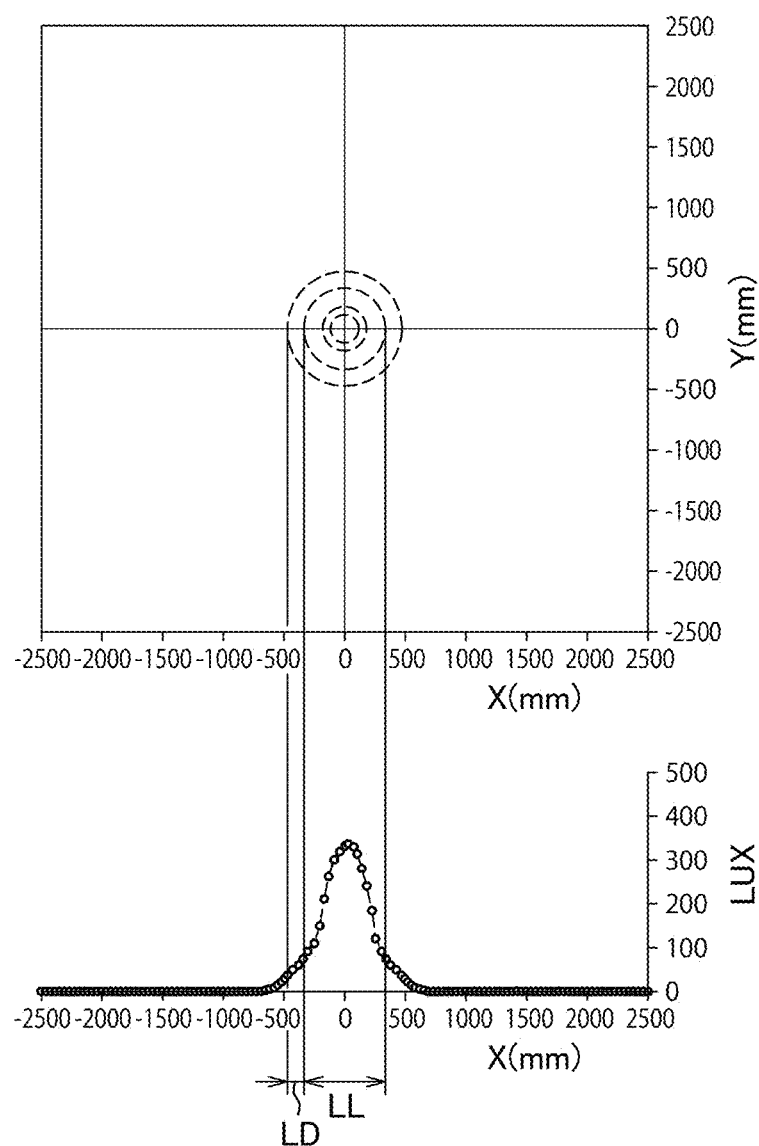
FIG. 15 is a luminance distribution of a light spot formed by the lighting device of FIG. 11 according to embodiment 1.
Figure 24:
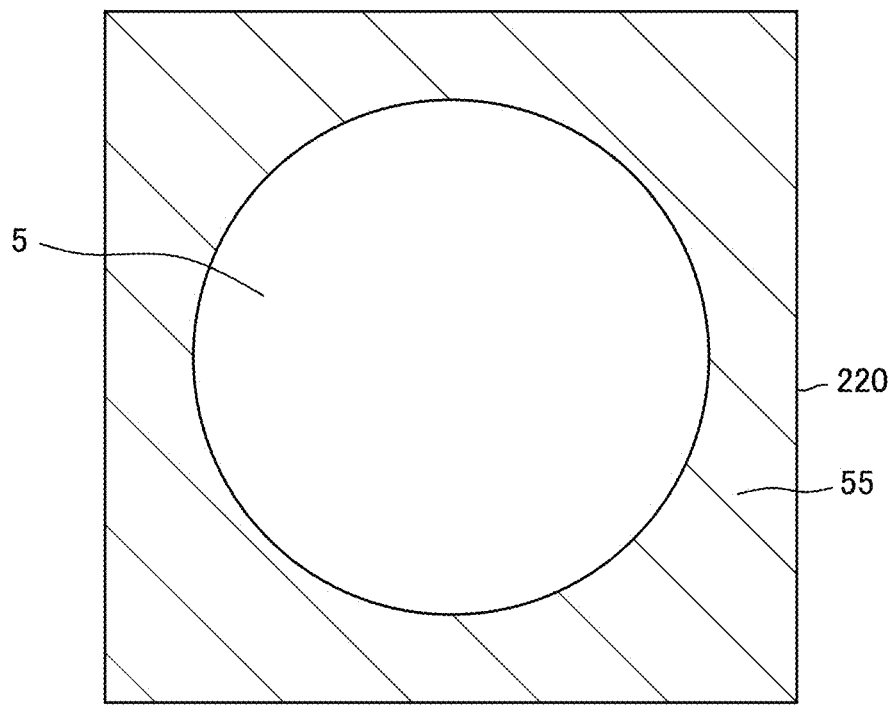
FIG. 24 is a plan view of the liquid crystal lens according to embodiment 3.

FIG. 15 is an example of light spot formed from the structures of FIGS. 11, 13 and 24. The measuring conditions are the same as that of FIG. 3. That is to say, the light spot is measured at the screen, 1000 mm apart from the lighting device. The horizontal axis and the vertical axis in both of the top figure and the bottom figure of FIG. 15 are the same as explained in FIG. 3. Comparing FIG. with FIG. 3, the light spot is sharper in FIG. 15 than that of FIG. 3. In other words, in the top figures, a size of the light spot is smaller in FIG. 15 than in FIG. 3; in the bottom figures, a foot is smaller in FIG. 15 than in FIG. 3.

When the luminance distribution of the light spot in FIG. 15 is compared with the luminance distribution of the light spot in FIG. 8, they are about the same. That is to say, although the light shading cylinder 30 is not used in FIG. 11, approximately the same luminance distribution can be obtained by adopting the liquid crystal lens having light shading film 40. A merit of FIG. 11 compared with FIG. 6 is that effect of the liquid crystal lens can be additionally obtained while keeping same luminance distribution as FIG. 6.

Figure 16:
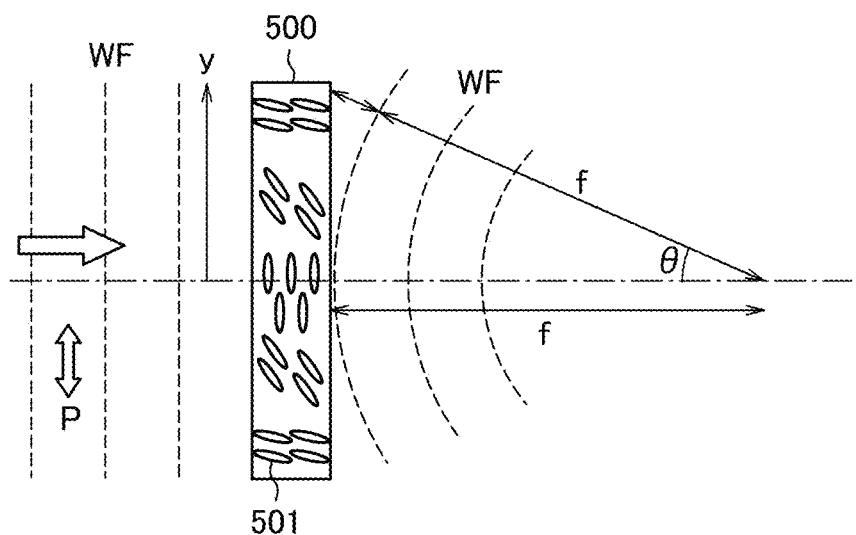
FIG. 16 is an example of convex lens formed by liquid crystal lens.

FIG. 16 is a cross sectional view which shows function of a liquid crystal lens. In FIG. 16, collimated light enters a liquid crystal layer 500 from left hand side. P in FIG. 16 means a polarized direction of impinging light. Generally, the polarized direction of normal light distributes randomly, however, the liquid crystal has an anisotropy in refraction; therefore, FIG. 16 shows a function of the liquid crystal layer 500 to the light polarized in P direction.

In FIG. 16, liquid crystal molecules 501 align as that a tilting angle becomes larger in going to periphery of the liquid crystal layer 500 due to electrical field from the electrodes. A liquid crystal molecule 501 has an elongated shape; effective refractive index in the long axis is larger than effective refractive index in the short axis in the liquid crystal molecule 501; therefore, refractive index in the liquid crystal layer 500 becomes larger in going to periphery, thus, a convex lens is formed. In FIG. 16, the broken line is a light wave front WF, and f is a focus distance.

Figure 17:
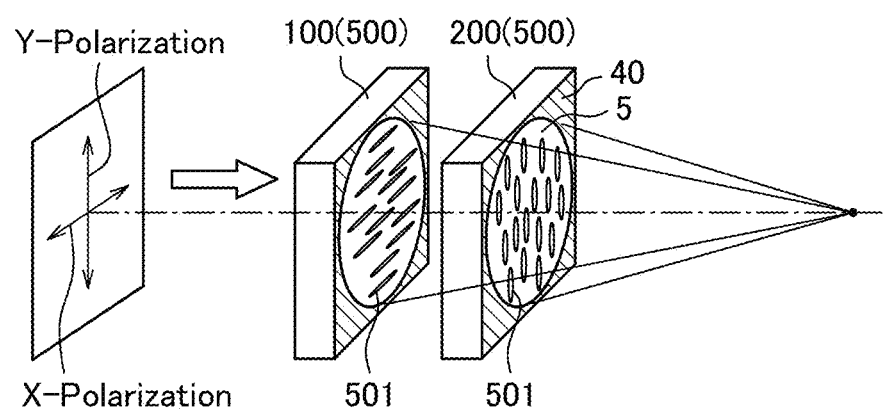
FIG. 17 is a perspective view of the liquid crystal lens structure of two liquid crystal lens system.

Since the liquid crystal lens acts only on the polarized light, a second liquid crystal lens, which acts on a light polarized orthogonally to the light on which the first liquid crystal lens acts, is necessary. FIG. 17 is an exploded perspective view which shows the lens structure. In FIG. 17, the parallelogram in left hand side is the wave front of light. In FIG. 17, the light polarized in x direction and the light polarized in y direction enters the liquid crystal layer 500. The first liquid crystal lens 100 works on the light polarized in x direction; the second liquid crystal lens 200 works on the light polarized in y direction.

In FIG. 17, initial alignment directions of the liquid crystal molecules 501 are orthogonal between in the first liquid crystal lens 100 and the second liquid crystal lens 200. The initial alignment direction of the liquid crystal molecule 501 is determined by alignment direction of the alignment film formed in the liquid crystal lens. That is to say, in FIG. 17, the alignment directions of the alignment films of the substrates on the side from which the light enters from outside in two liquid crystal lenses, are orthogonal to each other between two liquid crystal lenses.

In FIG. 17, transmitting areas 5 of the first liquid crystal lens 100 and the second liquid crystal lens 200 are circle. The transmitting areas 5 are defined by light shading films 40 formed in the first liquid crystal lens 100 and the second liquid crystal lens 200.

Figure 18:
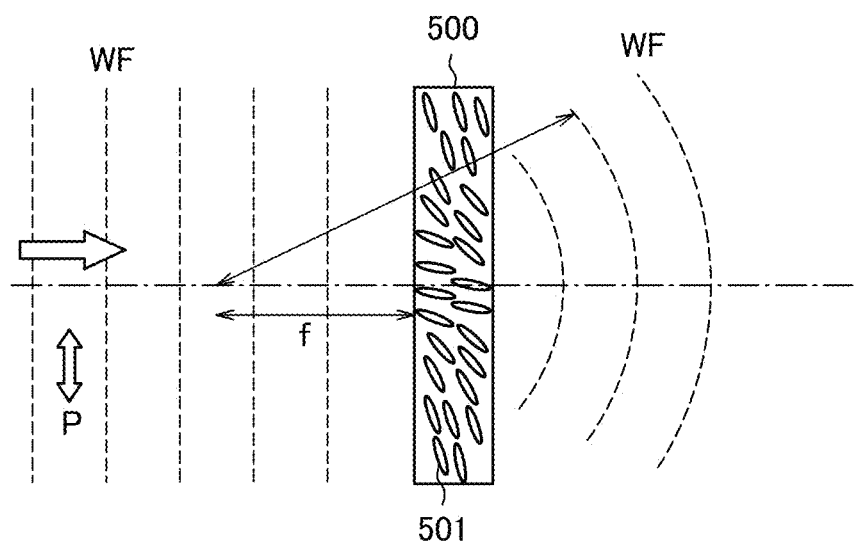
FIG. 18 is an example of concave lens formed by the liquid crystal lens.

FIG. 18 shows how to form a concave lens by liquid crystal lens. In FIG. 18, the light having the wave front WF, which is parallel to the liquid crystal layer 500, and polarized in one direction enters the liquid crystal layer 500 from left hand side. In FIG. 18, the liquid crystal molecules 501 align as that the tilting angle becomes smaller in going to periphery of the liquid crystal layer 500 due to electrical field from the electrodes. Due to the above lens structure, the wave front WF of light, which has passed the liquid crystal layer 500, becomes a curve as shown by broken line in FIG. 18, thus, concave lens is formed. In the meantime, in the case of concave lens also, two liquid crystal lenses are necessary as explained in FIG. 17.

Figure 19:
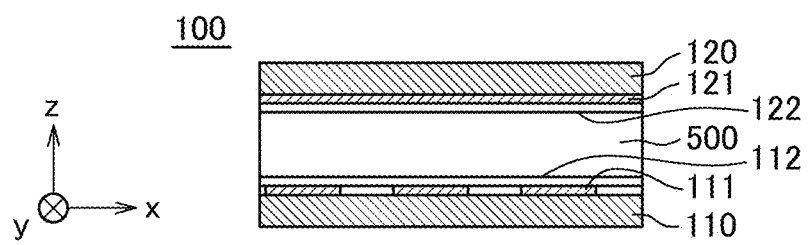
FIG. 19 is a cross sectional view of the liquid crystal lens.

FIG. 19 is a detailed cross sectional view of the liquid crystal lens 100. In FIG. 19, a first electrode 111 is formed on the TFT substrate 110 and a first alignment film 112 is formed covering the first electrode 111. The polarizing direction of the light which is modulated by the liquid crystal lens is determined by an alignment direction of the first alignment film 112. A second electrode 121 is formed inside of the counter substrate 120; a second alignment film 122 is formed covering the second electrode 121. A relation between the alignment direction of the first alignment film 112 and the alignment direction of the second alignment film 122 is determined by what kind of liquid crystal is used. The liquid crystal layer 500 is sandwiched between the TFT substrate 110 and the counter substrate 120.

Figure 20:
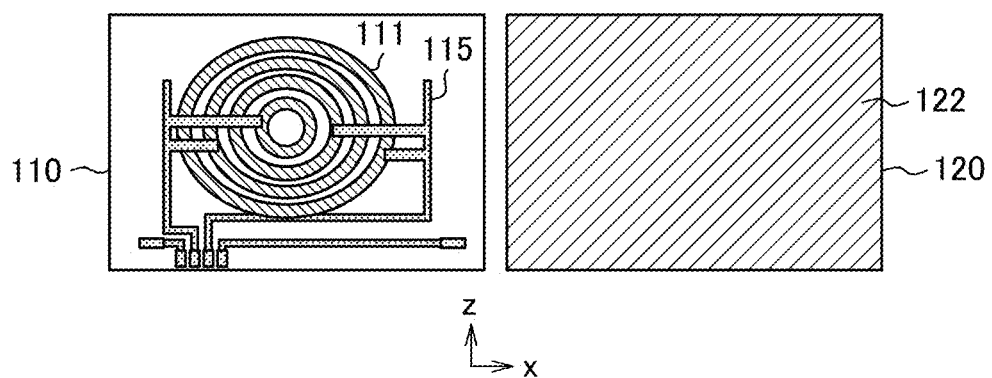
FIG. 20 is a plan view of electrodes formed on the TFT substrate and the counter substrate of the liquid crystal lens.

The figure of left hand side in FIG. 20 is a plan view of the first electrode 111 formed on the first substrate 110. The first electrodes 111 are shaped in concentric circles. A lead wiring 115 is connected to each of the circle shaped electrodes 111 to supply voltages. The figure of right hand side in FIG. 20 is a plan view of the second electrode 122 formed on the counter substrate 120. The second electrode 122 is a plane electrode, which is formed on approximately entire area of the counter substrate 120.

In FIG. 20, lenses of various intensity can be formed by changing voltages between the first electrode 111 and the second electrode 122. In the example of the liquid crystal lens in FIGS. 19 and 20, the first electrode 111 is formed in concentric circles, thus, it has a feature that a circular lens is easily formed. In the meantime, since the liquid crystal lens in FIGS. 19 and 20 are examples, the liquid crystal lens can take other electrode structures. Other liquid crystal lenses 200, 300, and 400 have the same structures as the liquid crystal lens except alignment direction of the alignment film.

Figure 21:
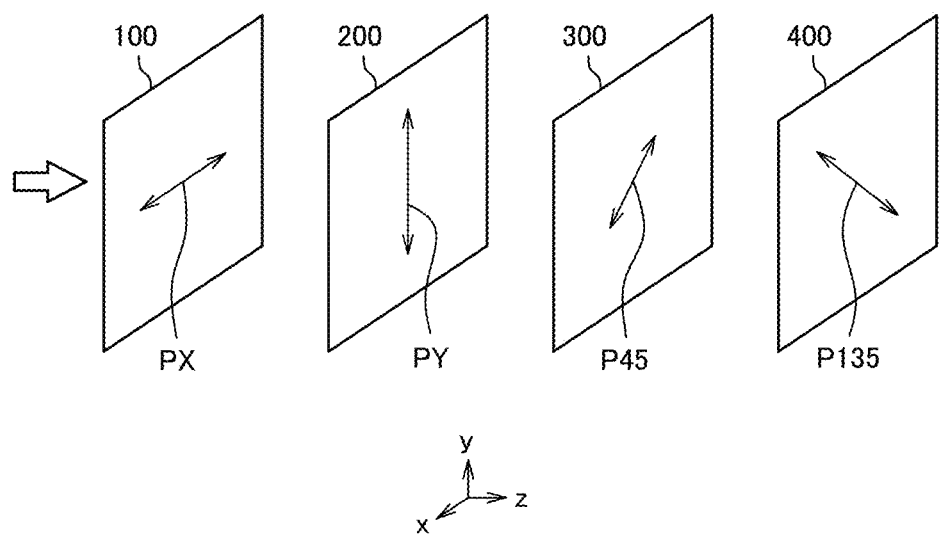
FIG. 21 is a model to show control of light by four liquid crystal lenses.

FIG. 21 shows a model how the first liquid crystal lens 100 through the fourth liquid crystal lens 400 act on the light entering the liquid crystal lens as shown by open arrow. In FIG. 21, the first liquid crystal lens 100 acts on the light PX polarized in x direction, the second liquid crystal lens 200 acts on the light PY polarized in Y direction, the third liquid crystal lens 300 acts on the light P45 polarized in 45 degrees from x direction, the fourth liquid crystal lens 400 acts on the light P135 polarized in 135 degrees from x direction. Thus, the liquid crystal lens can act on the light polarized approximately all directions.

By the way, an order of the liquid crystal lenses 100, 200, 300, and 400 with respect to a propagating direction of light is not limited in the order of FIG. 21. FIG. 21 uses four liquid crystal lenses, however, two liquid crystal lenses can also be adopted. In this case, two liquid crystal lenses in which acting polarizing directions are orthogonal to each other can be used.

The embodiments below are examples of various light shading films formed in the liquid crystal lens in the present invention. In the embodiment below, the liquid crystal lens is explained as to have a two lens structure; however, the principle is the same for four lens structure. When the four lens structure is taken, the two lens structure, which is explained below, is stacked; the alignment directions of the alignment film are as explained in FIG. 21.

Embodiment 2

Figure 22:
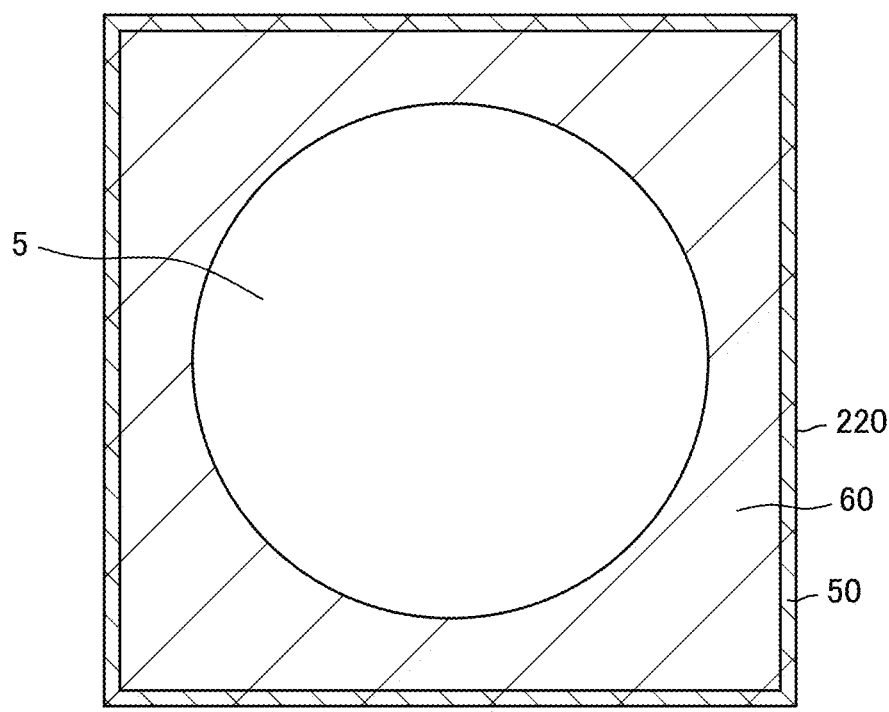
FIG. 22 is a plan view of the liquid crystal lens according to embodiment 2.
Figure 23:
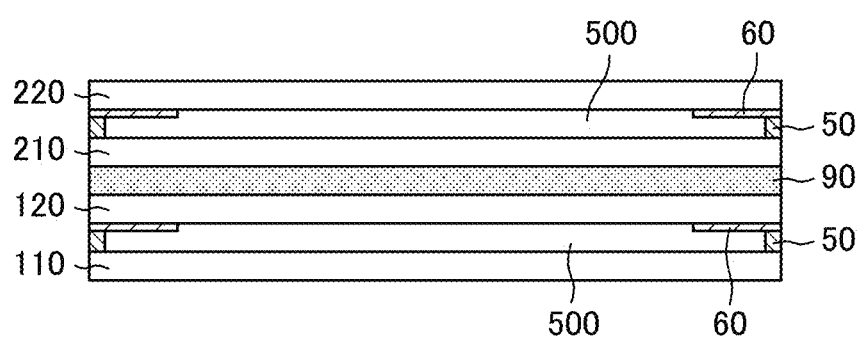
FIG. 23 is a cross sectional view of the liquid crystal lens according to embodiment 2.

FIG. 22 is a plan view of a liquid crystal lens according to embodiment 2; FIG. 23 is a cross sectional view of FIG. 22. The basic structure of the liquid crystal lens according to FIGS. 22 and 23 is the same as explained in FIGS. 13 and 14. FIGS. 22 and 23 differ from FIGS. 13 and 14 in that the light shading film is not an outer light shading film 40 formed outside of the liquid crystal lens but an inner light shading film 60 formed from a black matrix formed inside of the liquid crystal lens.

The black matrix is an established technology in the field of liquid crystal display device; using black matrix in forming the inner light shading film 60 has a merit of being able to use this established technology. The effect of forming the inner light shading film 60 is the same as explained in embodiment 1. The inner light shading film 60 by black matrix can be formed on the TFT substrate 110 or the counter substrate 120, or both of the TFT substrate 110 and the counter substrate 120.

In the meantime, the inner light shading film 60 is formed by so called black matrix in the above explanation; however, the light shading film can be formed from metal provided suppressing reflection.

Embodiment 3

Figure 25:
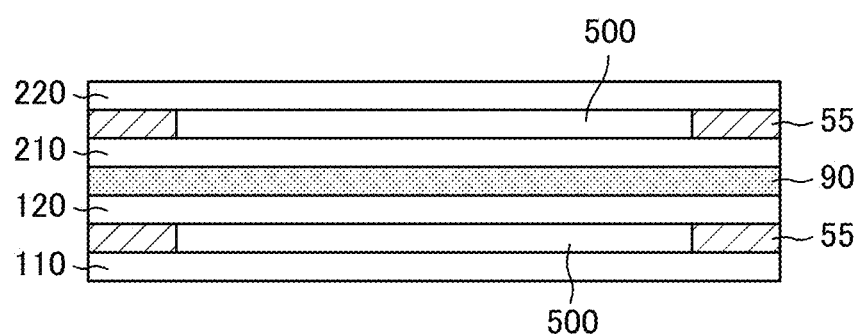
FIG. 25 is a cross sectional view of the liquid crystal lens according to embodiment 3.

FIG. 24 is a plan view of the liquid crystal lens according to embodiment 3; FIG. 25 is a cross sectional view of FIG. 24. A basic structure of the liquid crystal lens in FIGS. 24 and 25 is the same as that of the liquid crystal lens in FIGS. 13 and 14. FIGS. 24 and 25 differ from FIGS. 13 and 14 in that a width of the seal material 55, which adheres the TFT substrate 100 and the counter substrate 200 to each other, is much larger than that of normal seal material 55 so that the seal material 55 has a role of a light shading film 55.

In this case, black resin is used for the seal material 55. Since a width of general seal material is narrow, it is coated by dispenser. However, the seal material 55 in this embodiment is, as shown in FIG. 23, coated in wide area, thus, it is more suitable to use ink jet printing or screen printing. A viscosity of the black resin is controlled to be suitable to ink jet printing or screen printing. The structure explained above is the same as in second liquid crystal lens 200 through fourth liquid crystal lens 400.

Embodiment 4

Figure 26:
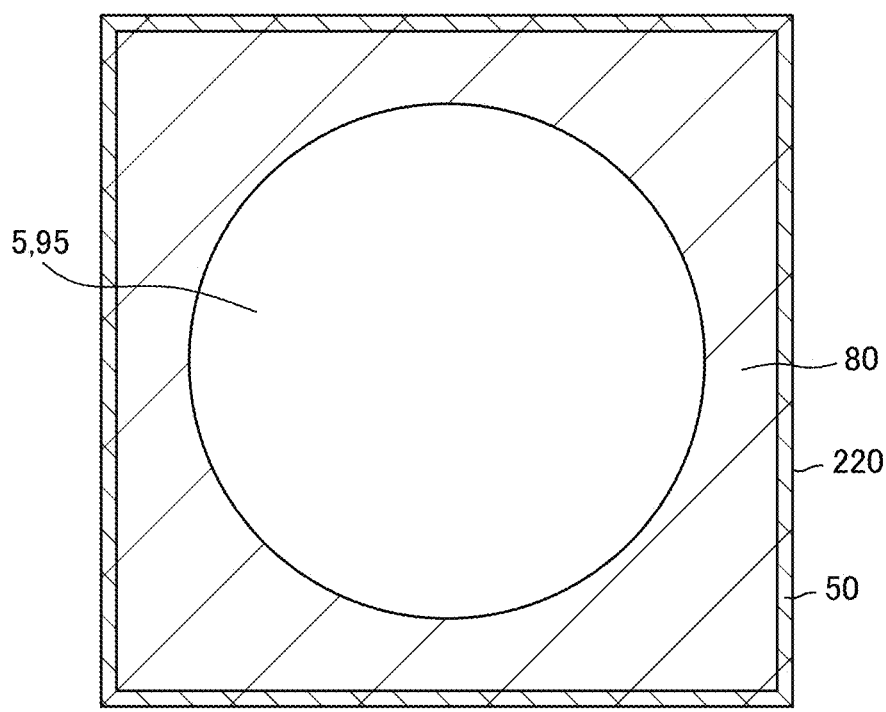
FIG. 26 is a plan view of the liquid crystal lens according to embodiment 4.
Figure 27:
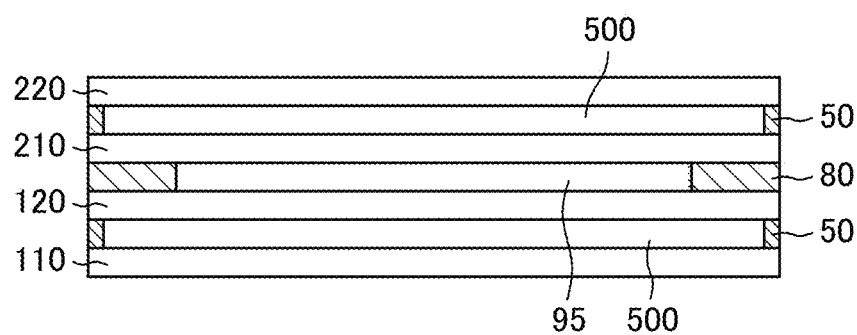
FIG. 27 is a cross sectional view of FIG. 26.

FIG. 26 is a plan view of the liquid crystal lens according to embodiment 4; FIG. 27 is a cross sectional view of FIG. 26. A basic structure of the liquid crystal lens in FIGS. 26 and 27 is the same as that of the liquid crystal lens in FIGS. 13 and 14. FIGS. 26 and 27 differ from FIGS. 13 and 14 in that the light shading films are not the external light shading films 40 but black adhesives 80 which adhere the first liquid crystal lens 100 and the second liquid crystal lens 200 to each other.

The adhesive 80 is formed in a shape of the light shading film in FIG. 26 and is adhered to the counter substrate 120 of the first liquid crystal lens 100; then, the second liquid crystal lens 200 is adhered to the first liquid crystal lens 100. A black adhesive tape 80 can be used instead of the black adhesive 80. The black adhesive tape 80 can be used as the same material as used to adhere the liquid crystal display panel and a backlight to each other. It is the same in adhering the second liquid crystal lens 200 with the third liquid crystal lens 300, or adhering the third liquid crystal lens 300 with the fourth liquid crystal lens 400.

Figure 28:
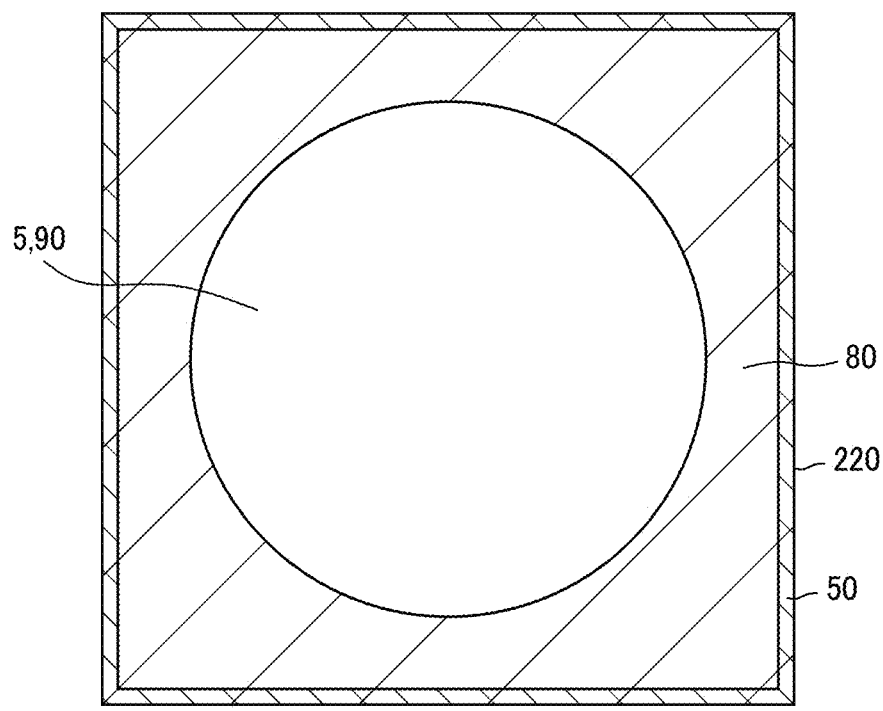
FIG. 28 is a plan view of the liquid crystal lens according to another example of embodiment 4.
Figure 29:
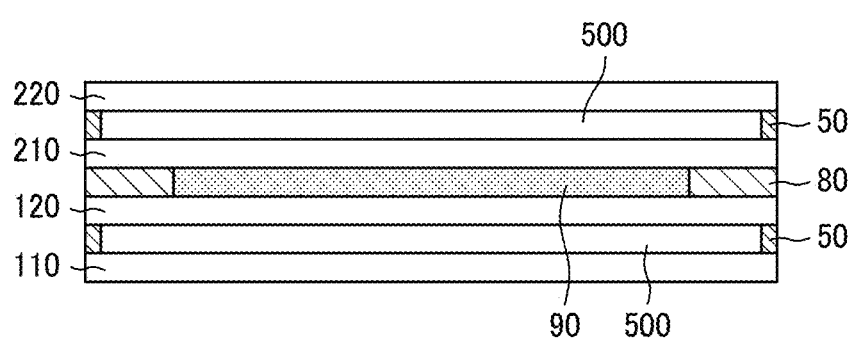
FIG. 29 is a cross sectional view of FIG. 28.

In FIG. 26, a region in which no black adhesive tape 80 does not exist is a space 95. The space 95 is a light transparent area 5. The space 95 could cause a loss of transmittance of light due to reflection because of a difference in refraction index between the space and glass. In that case, transparent substance 90, which has a similar refraction index as the glass, is filled in the space 95 as shown in FIGS. 28 and 29. Other structures in FIGS. 28 and 29 are the same as in FIGS. 26 and 27. It is the same in adhering the second liquid crystal lens 200 with the third liquid crystal lens 300, or adhering the third liquid crystal lens 300 with the fourth liquid crystal lens 400.

Embodiment 5

The structures of embodiment 1 through embodiment 4 can be used in combination. Bad influence due to stray light to the projected light could be avoided by using the structures in combination.

Figure 30:
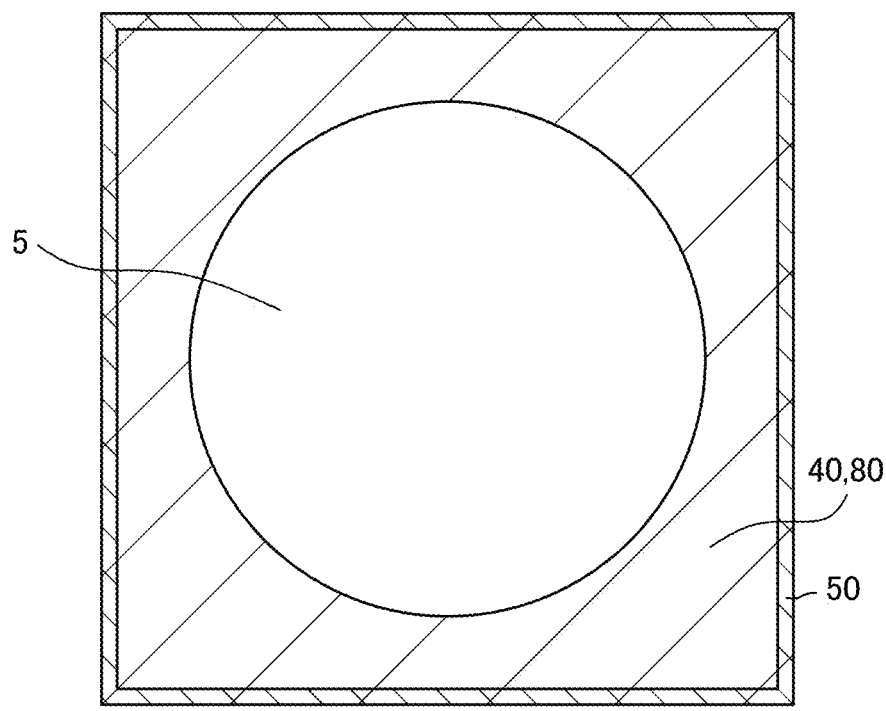
FIG. 30 is a plan view of the liquid crystal lens according to embodiment 5.
Figure 31:
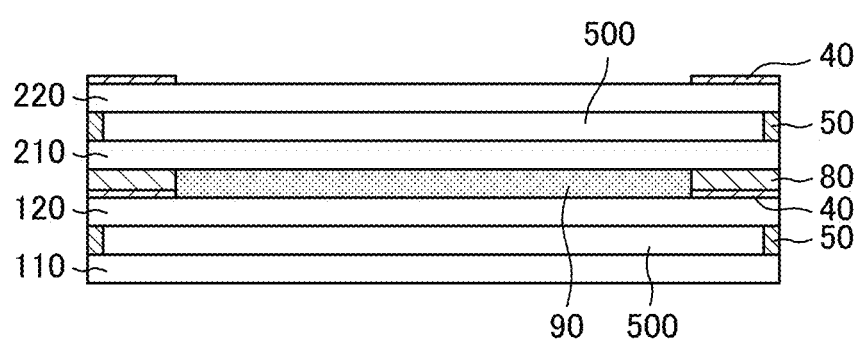
FIG. 31 is a cross sectional view of FIG. 30.
Figure 32:
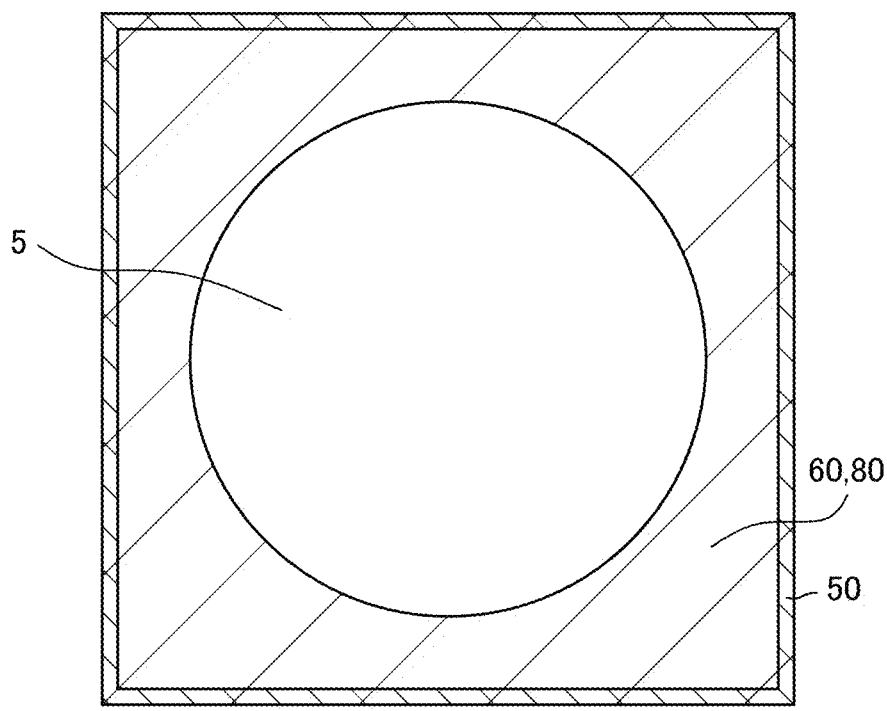
FIG. 32 is a plan view of the liquid crystal lens according to another example of embodiment 5.
Figure 33:
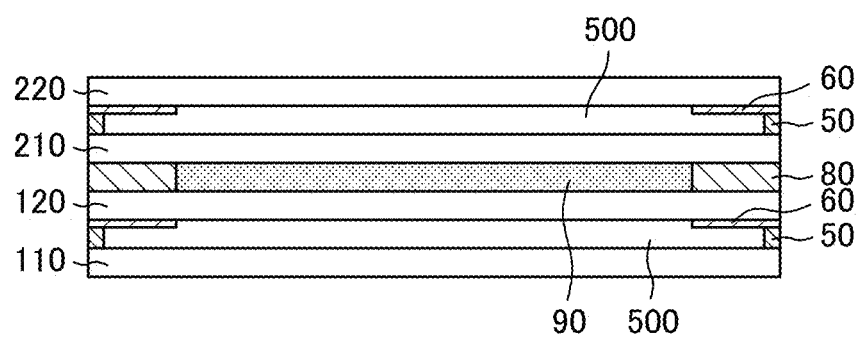
FIG. 33 is a cross sectional view of FIG. 32.
Figure 34:
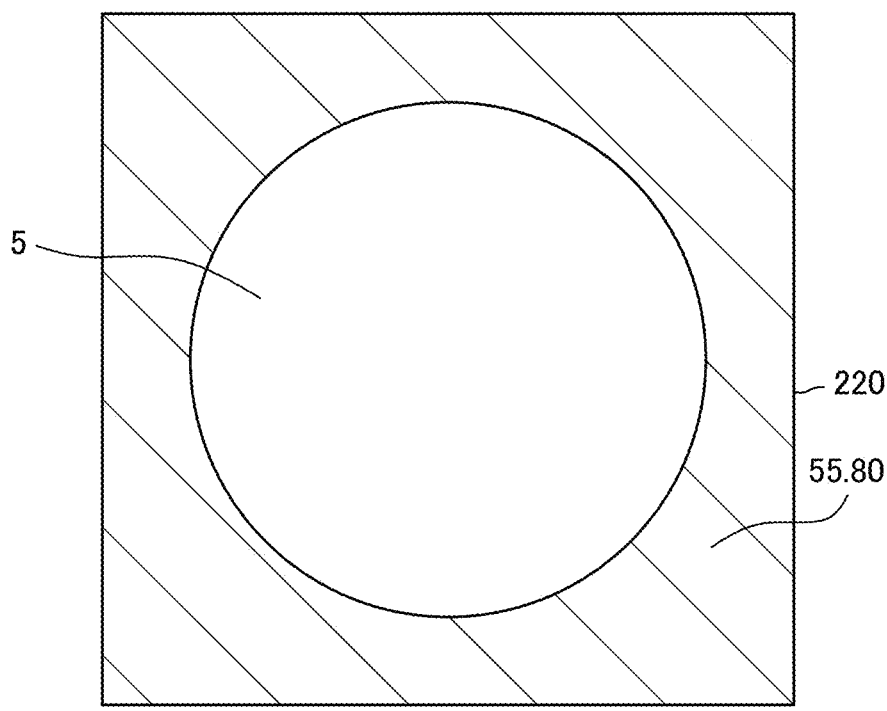
FIG. 34 is a plan view of the liquid crystal lens according to yet another example of embodiment 5.
Figure 35:
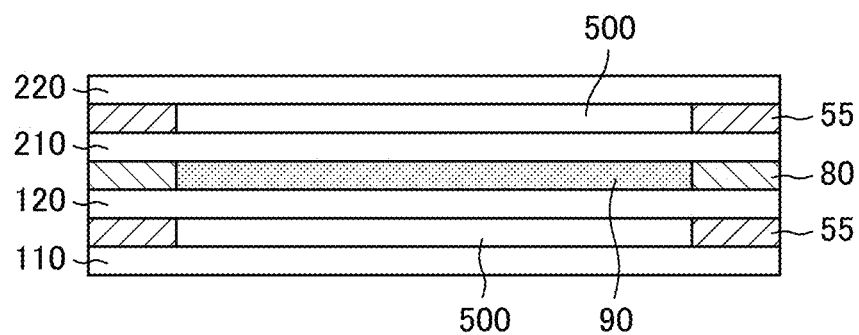
FIG. 35 is a cross sectional view of FIG. 34.

FIGS. 30 and 31 are an example in which embodiment 4 and embodiment 1 are combined. FIGS. 32 and 33 are an example in which embodiment 4 and embodiment 2 are combined. FIGS. 34 and 35 are an example in which embodiment 4 and embodiment 3 are combined. Those three combinations are only examples; other combinations of embodiments are possible according to necessity.

In the meantime, if sharper light spot is desirable than that of embodiments 1 through 5, in which a lighting device including the liquid crystal lens is used, the light shading cylinder 30 can be used as explained in FIGS. 6 and 7. In this case a height of the light shading cylinder 30 is added, consequently, a depth of the lighting device becomes larger. Therefore, a tradeoff between a light spot and a depth of the lighting device is necessary.

What is claimed is:

1. A lighting device comprising:
a reflector cylinder including a mirror thereinside; and
a liquid crystal lens assembly that is disposed at a light emitting surface of the reflector cylinder and includes a plurality of liquid crystal lenses being stacked,
wherein the liquid crystal lens assembly includes a light shading film which defines a light emitting area of the liquid crystal lens assembly and which is formed in parallel with the light emitting surface of the reflector cylinder, and
the light shading film is formed from black adhesive to adhere the plurality of liquid crystal lenses with each other.

2. The lighting device according to claim 1, wherein an outer shape of the liquid crystal lens is rectangle, and the light emitting area is circle in a plan view.

3. The lighting device according to claim 1, wherein the plurality of liquid crystal lenses are two liquid crystal lenses.

4. The lighting device according to claim 1, wherein the plurality of liquid crystal lenses are four liquid crystal lenses.

5. The lighting device according to claim 1, wherein the liquid crystal lens has structure in which liquid crystal is sandwiched between a first substrate and a second substrate,
the first substrate and the second substrate adhere with black seal material.

6. The lighting device according to claim 1, wherein transparent resin is formed inside of the black adhesive and between the plurality of liquid crystal lenses in a plan view.

7. The lighting device according to claim 1, wherein the mirror formed in the reflector cylinder is a parabolic mirror.

8. The lighting device according to claim 1, wherein a light shading cylinder is disposed between the reflector cylinder and the liquid crystal assembly, and
an inside of the light shading cylinder is a light absorbing layer.

* * * * *